(12) United States Patent
Bettiol

(10) Patent No.: US 10,662,631 B2
(45) Date of Patent: May 26, 2020

(54) VALVULAR DEVICE

(71) Applicant: BETTIOL s.r.l., Chioggia (VE) (IT)

(72) Inventor: Davide Bettiol, Chioggia (IT)

(73) Assignee: BETTIOL S.R.L., Chioggia (VE) (IT)

( * ) Notice: Subject to any disclaimer, the term of this patent is extended or adjusted under 35 U.S.C. 154(b) by 0 days.

(21) Appl. No.: 15/569,828

(22) PCT Filed: Apr. 28, 2016

(86) PCT No.: PCT/IB2016/052411
§ 371 (c)(1),
(2) Date: Oct. 27, 2017

(87) PCT Pub. No.: WO2016/174608
PCT Pub. Date: Nov. 3, 2016

(65) Prior Publication Data
US 2018/0142452 A1 May 24, 2018

(30) Foreign Application Priority Data

Apr. 28, 2015 (IT) .............................. VE2015A0019

(51) Int. Cl.
| | |
|---|---|
| *F16K 15/18* | (2006.01) |
| *F16K 15/14* | (2006.01) |
| *F16K 15/16* | (2006.01) |
| *E03C 1/298* | (2006.01) |
| *E03F 5/042* | (2006.01) |
| *F16K 15/03* | (2006.01) |

(52) U.S. Cl.
CPC .............. *E03C 1/298* (2013.01); *E03F 5/042* (2013.01); *F16K 15/031* (2013.01);
(Continued)

(58) Field of Classification Search
CPC ......... Y10T 137/7879; Y10T 137/7888; Y10T 137/7891; Y10T 137/7895;
(Continued)

(56) References Cited

U.S. PATENT DOCUMENTS

| | | | | |
|---|---|---|---|---|
| 3,593,732 A | * | 7/1971 | Holscher ............... | F16K 15/144 137/112 |
| 3,895,632 A | * | 7/1975 | Plowiecki ............ | A61M 39/06 137/852 |

(Continued)

FOREIGN PATENT DOCUMENTS

| | | |
|---|---|---|
| DE | 608721 C | 1/1935 |
| DE | 1173300 B | 7/1964 |
| EP | 2754764 A1 | 7/2014 |

*Primary Examiner* — Hailey K. Do
(74) *Attorney, Agent, or Firm* — Volpe and Koenig, P.C.

(57) ABSTRACT

A valve device for a domestic wastewater pipe is provided. The valve device includes a shutter and a fixing element to hold the shutter in the passage of the main duct between the inlet opening and the outlet opening of the pipe. The shutter is movable between a first configuration occluding the passage to prevent the flow of gaseous fluids, and a second configuration allowing the wastewater to flow from the inlet opening to the outlet opening of the pipe. The valve device includes a deformable main body partly defining the shutter, which occludes the passage of the main duct when the shutter is in the first configuration so that a pressure exerted by the wastewater on the shutter causes a reversible elastic deformation of said main body that moves the shutter from the first to the second configuration.

13 Claims, 3 Drawing Sheets

Figure 1:
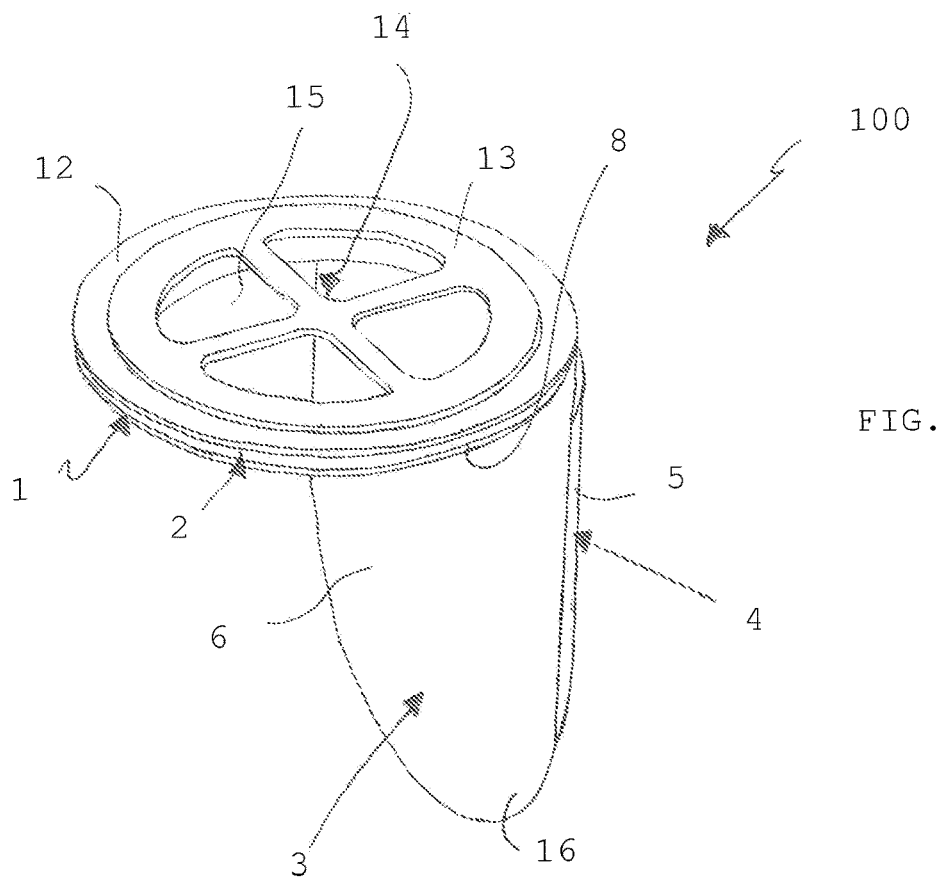

(52) U.S. Cl.
CPC ............ *F16K 15/144* (2013.01); *F16K 15/16* (2013.01); *F16K 15/185* (2013.01)

(58) Field of Classification Search
CPC ......... Y10T 137/3786; Y10T 137/7504; F16K 15/03; F16K 15/031; F16K 15/14; F16K 15/144; F16K 15/145; F16K 15/16; F16K 15/181; F16K 15/185; F16K 17/164; E03C 1/298; E03F 5/042
See application file for complete search history.

(56) References Cited

U.S. PATENT DOCUMENTS

| | | | |
|---|---|---|---|
| 4,039,004 A | | 8/1977 | Luthy |
| 4,842,014 A | * | 6/1989 | Strelow .................. F16K 15/03 137/527.2 |
| 2002/0144738 A1 | * | 10/2002 | Unger ............... B01L 3/502707 137/824 |
| 2004/0250863 A1 | * | 12/2004 | Atkeson ............... F16K 15/031 137/855 |
| 2007/0240772 A1 | * | 10/2007 | Durrani .................... E03F 7/04 137/527.8 |
| 2014/0261789 A1 | * | 9/2014 | Hull ....................... F16K 15/03 137/527.8 |
| 2014/0373943 A1 | * | 12/2014 | Huber .................. E03F 5/0407 137/362 |
| 2015/0136137 A1 | * | 5/2015 | Bugamelli .......... A61M 16/208 128/205.24 |

\* cited by examiner

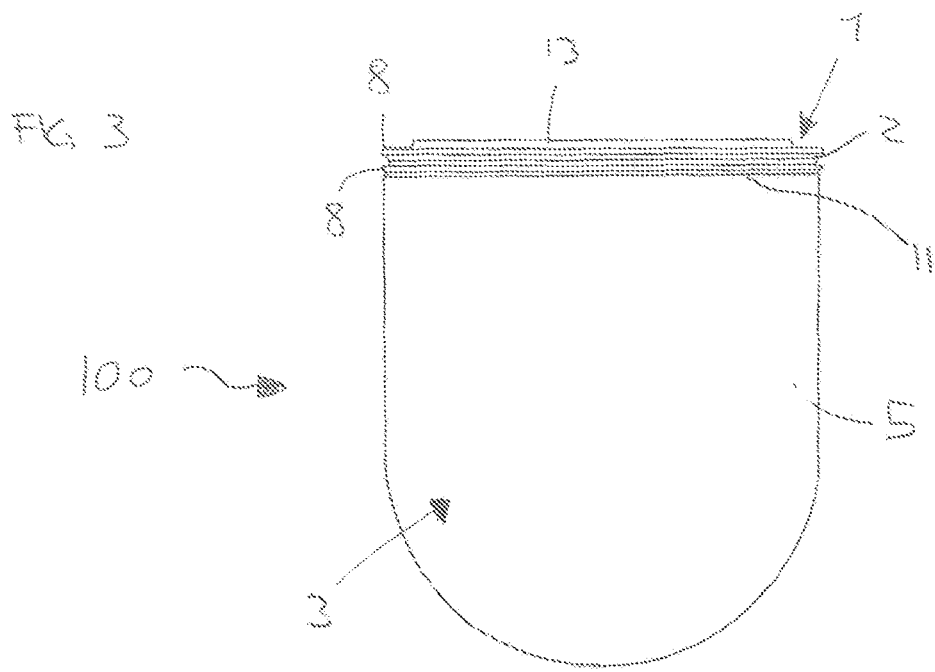
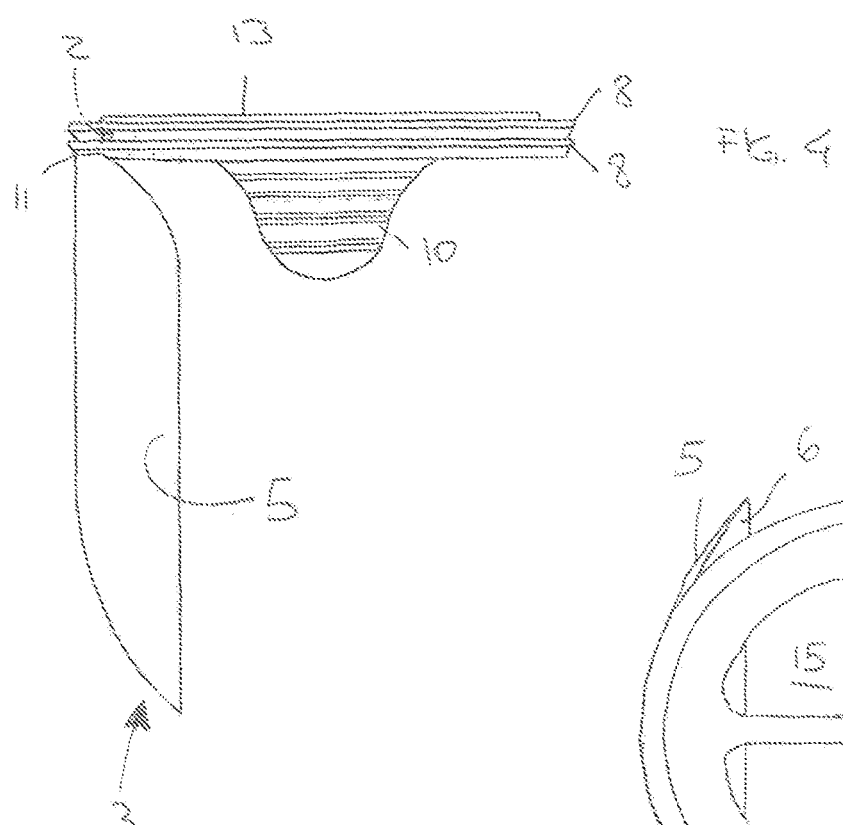
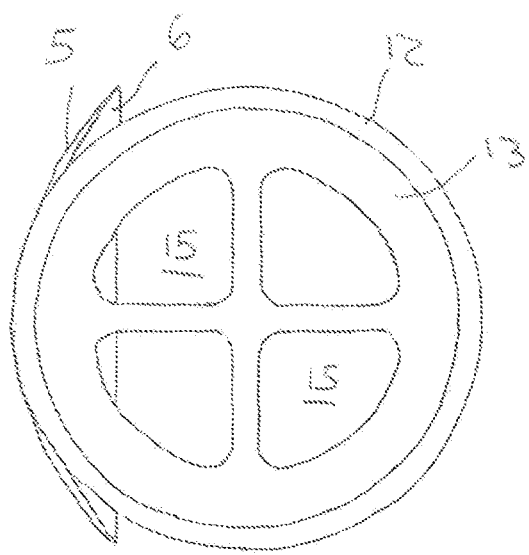

VALVULAR DEVICE

This invention relates to a valve device intended to be placed in a tube used for the passage of domestic wastewater.

The device according to the invention applies particularly, but not exclusively, to the technical sector of hydraulic drainage systems for residential buildings, these systems being used for the disposal of wastewater into municipal sewers or septic tanks.

In the technical sector of hydraulic systems it is particularly known to install so-called non-return valves in wastewater drainage conduits that allow said wastewater to flow towards the sewer but prevent an undesirable backflow of the wastewater and unpleasant odours from the sewage pipes towards the rooms in the buildings.

These non-return valves typically comprise a manifold having a seat inside to house a rigid swivel paddle. The manifold also has an abutment surface against which the paddle is pushed by a possible return flow into the drainage conduit, interrupting the flow.

It must be noted, however, that the installation of the above-mentioned valves in previously constructed drainage systems inevitably involves an intervention on the drainage pipes by specialised persons who must replace a section of pipe with the non-return valve or connect the latter to the pipe. This results in a high valve installation cost.

In the above-mentioned technical sector, the use of a siphoning pipe is also known in order to solve the problem of the rise of unpleasant odours from the sewage pipes towards the building.

The Applicant has observed, however, that if the appliances connected to the siphoning pipe are not used for a long time, the residual water in the stagnation area of the syphon gradually evaporates, which causes the fumes from the pipes to pass through and disperse into the rooms in the building. This solution is therefore unsuitable for residential buildings that remain unused for relatively long periods of time such as dwellings used exclusively for spending a holiday period.

It is also known to connect a valve device to an inspection T-connection of a drainage pipe, the connection having a tubular body in which the wastewater flows and an inspection neck extending perpendicularly to the tubular body and closed at the top by a cap.

An example of such a system is described in U.S. Pat. No. 4,039,004 A.

U.S. Pat. No. 4,039,004 A refers to a fitting device for a non-return valve to fix the latter to the inside of a pipe fitting provided with an inspection neck. The valve comprises a rigid paddle hinged to a cylindrical support and is associated with the pipe fitting by means of an annular body, made of a resilient material, of the fitting device. This annular body is fitted onto the cylindrical support and inserted into the tubular pipe of the pipe fitting in which the wastewater flows.

The Applicant has observed, however, that this solution has several drawbacks such as the partial occlusion of the tubular pipe due to the presence of the cylindrical support and the annular body.

Furthermore, this solution, having a plurality of components with mechanical properties that differ substantially from each other, is structurally complex and relatively expensive to make.

The problem underlying the present invention is to provide a valve device that is structurally and functionally designed to overcome the drawbacks encountered with reference to the cited state of the art.

In the context of this problem, an object of the invention is to provide a valve device that can be positioned in a pipe used for the passage of domestic wastewater in order to substantially prevent the flow of gaseous fluids from the sewage system towards a room in a building through the drainage pipe, that is, to keep the fumes from the sewage system within the drainage pipe thus preventing them from dispersing upstream of the drainage pipe.

Another object of the invention is to provide a valve device capable of blocking the rise into the drainage pipe of any insect infestations. Another object of the invention is to provide a valve device that is cheap to make and can be easily positioned in a drainage pipe that is already installed, i.e. already laid in the ground.

Another object of the invention is to provide a valve device to be installed in a drainage pipe without, however, the need to replace a section thereof. Another object of the invention is to provide drainage pipes that have no backflow systems with a valve device that prevents the rise of fumes from the sewage system without the need for expensive building interventions. This problem is solved and these objects are at least partly achieved by means of a valve device according to the independent claim accompanying the present description.

Preferred characteristics of the invention are defined in the dependent claims.

Figure 2:
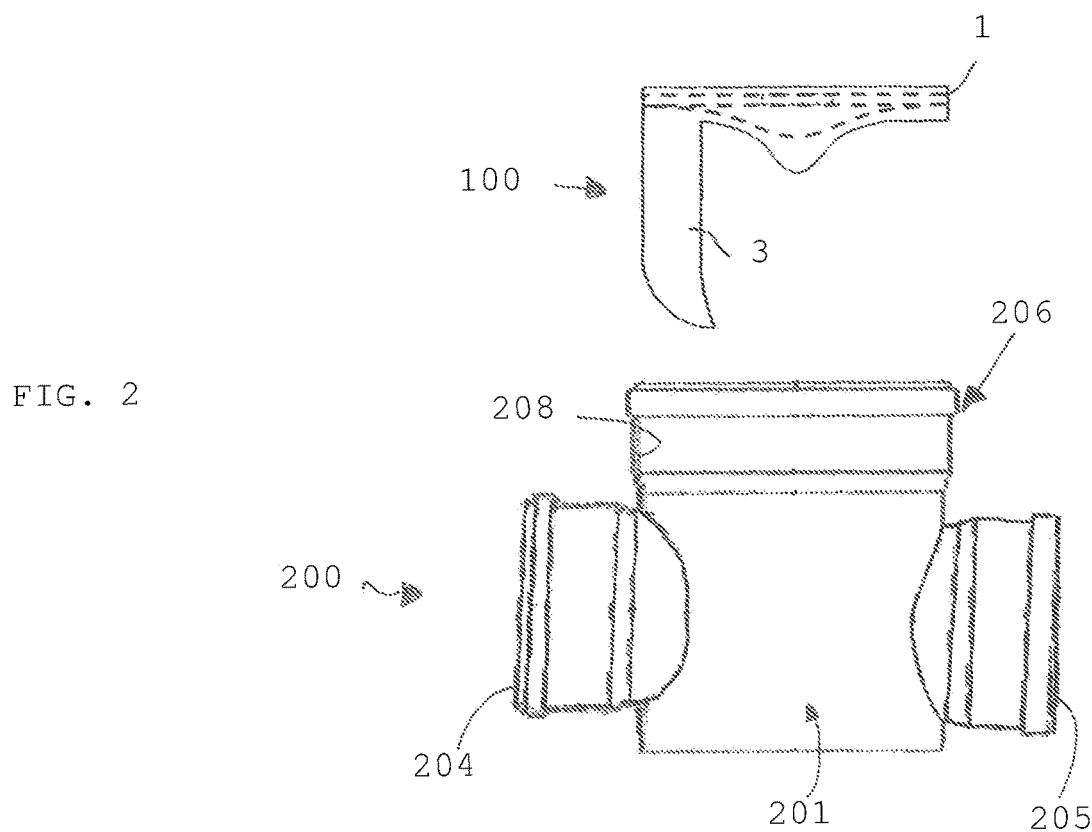
Figure 6:
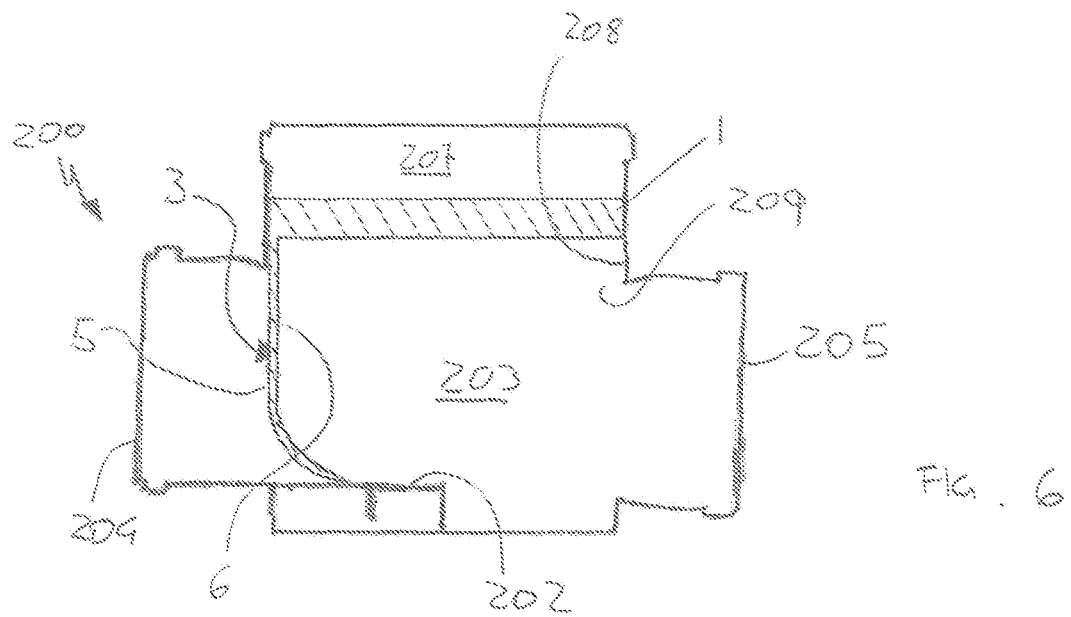
Figure 7:
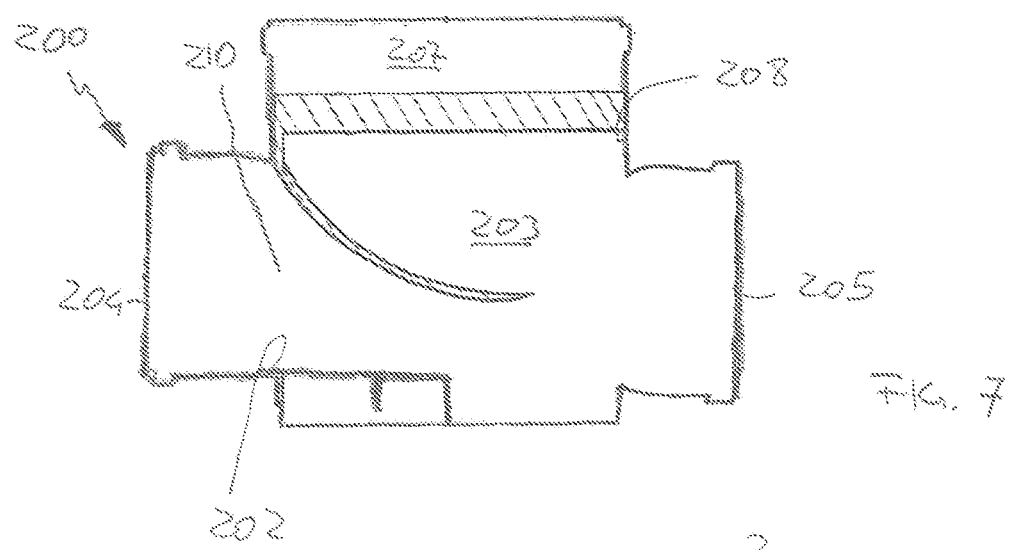
Figures 8, 9:
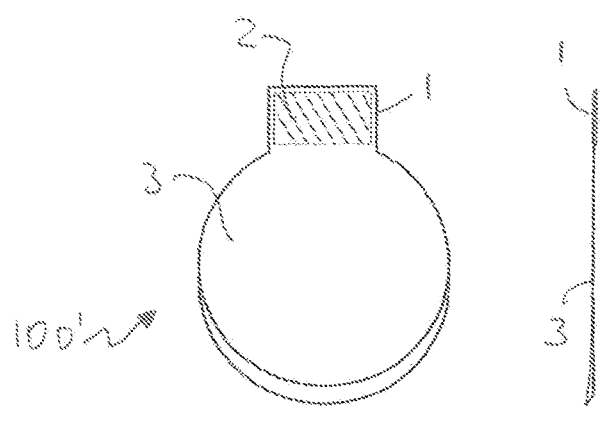

The characteristics and further advantages of the invention will be more apparent from the following detailed description of a preferred, although not exclusive, embodiment which is illustrated by way of indication and without limitation with reference to the accompanying drawings, in which:

FIG. 1 is a perspective schematic view of a valve device according to the invention, FIG. 2 is a schematic view of a valve device according to the invention and of a pipe in which said device can be positioned, FIG. 3 is a front schematic view of the device in FIG. 1, FIG. 4 is a side schematic view of a valve device according to the invention, FIG. 5 is a top schematic view of the device in FIG. 1, FIG. 6 is a cross-sectional view of the pipe in FIG. 2 in which is positioned a valve device according to the invention in a first configuration, FIG. 7 is a cross-sectional view of the pipe in FIG. 2 in which is positioned a valve device according to the invention in a second configuration, and FIGS. 8 and 9 are schematic views of an additional embodiment of the invention.

With reference firstly to FIG. 1, reference numeral 100 indicates as a whole a valve device according to the present invention, it being possible to position the valve device 100 in a pipe 200 used for the passage of domestic wastewater.

Preferably, the pipe 200 defines a section of a drainage pipe that connects one or more appliances to a sewage system, the appliances introducing into said drainage pipe a flow of domestic wastewater.

Preferably, the pipe 200 defines a section of drainage pipe which extends outside the building, or complex of buildings, that are connected to said drainage pipe. The pipe 200 is preferably made of a plastics material, more preferably of PVC.

By way of example, the appliances designed to introduce into the drainage pipe a flow of domestic wastewater can be a toilet, bidet, shower tray, bath, hand basin, kitchen sink, washing machine or dishwasher.

Preferably, the drainage pipe defines a gravity drainage system, i.e. the wastewater flows from the above-mentioned appliances into the drainage pipe towards the sewage system by gravity.

The pipe 200 comprises a main duct 201 whose internal surface 202 delimits a passage 203 for the flow of wastewater from an inlet opening 204 to an outlet opening 205 of the pipe 200.

In other words, the wastewater from an appliance flows along a first section of the drainage pipe upstream of pipe 200, gets into the pipe 200 from the inlet opening 204 and exits therefrom through the outlet opening 205. The outlet opening 205 is connected to a second section of the drainage pipe that conveys the wastewater from the pipe 200 to the sewage system.

The main duct 201 is preferably cylindrical with a diameter that can be between 100 mm and 400 mm. More preferably, the diameter of the main duct 201 is 100, 110, 125, 140, 160, 180, 200, 225, 250, 280, 315, 355 or 400 mm.

The pipe 200 also comprises an inspection neck 206 extending from the main duct 201 in a transverse direction thereto (in particular, perpendicular). The inspection neck 206 is provided with a longitudinal, preferably cylindrical, hole 207 and an internal wall 208 that radially delimits said hole. The hole 207 defines an access opening 209 to the passage 203 of the main duct 201. The hole 207 defines in the inspection neck 206 a second opening longitudinally opposite the access opening 209 which is closed by a removable cap.

Preferably, the pipe 200 is an inspection pipe fitting commonly used in domestic wastewater drainage pipes. More preferably, the pipe is T-shaped. Preferably, the pipe 200 is laid at an incline of between 0.25% and 3%. The pipe 200 is preferably accommodated in an inspection pit in the ground.

According to the invention, the valve device 100 comprises a shutter 3 and a fixing element 1 which is arranged to be connected to the inspection neck 206 in order to hold the shutter 3 in the passage 203 of the main duct 201 between the inlet opening 204 and the outlet opening 205 of the pipe 200. Preferably, the fixing element 1 can be connected to the inspection neck 206 in a removable manner so that the valve device 100 can be positioned in the pipe 200 and removed therefrom if necessary.

In an embodiment of the invention not shown in the Figures, the fixing element 1 is fixed to the cap closing the inspection neck 206 so that the introduction (by push-fitting) of said cap into the hole 207 of the inspection neck 206, or its being screwed onto the inspection neck 206, causes the introduction of the shutter 3 into the passage 203 of the main duct 201.

In another embodiment of the invention, the fixing element 1 is intended to be inserted into the hole 207 of the inspection neck 206.

With reference to FIGS. 1-7, the fixing element 1 comprises a perimetric surface 2 and is arranged so as to interfere with the internal wall 208 of the inspection neck 206 by means of the perimeter surface 2 in order to hold the valve device 100 in the pipe 200 in a desired position, i.e. to keep the shutter 3 in the passage 203 of the main duct 201 between the inlet opening 204 and the outlet opening 205 of the pipe 200.

According to an aspect of the invention, the shutter 3 can be moved between a first configuration and a second configuration.

In the first configuration, the shutter 3 is shaped to occlude the passage 203 of the main duct 201 so as to substantially prevent the flow of gaseous fluids from the outlet opening 205 towards the inlet opening 204 of the pipe 200, preferably when the pressure downstream of the valve device 100 is greater than that present in the drainage pipe upstream of the valve device 100.

In other words, in the first configuration the shutter 3 is shaped to hold back the gaseous fluids present downstream of the valve device 100 in relation to the direction of flow of the wastewater, substantially preventing said fluids from travelling upstream of the drainage pipe and spreading into the rooms of the buildings connected thereto.

In the context of the present invention, the expression "substantially prevent the flow of gaseous fluids from the outlet opening 205 towards the inlet opening 204 of the pipe 200" means that the shutter 3 can seal off the gaseous fluids when it is in the first configuration. However, it might be expected that a small amount of the above-mentioned gaseous fluids, such as not to be perceived by the users of the rooms located upstream of the drainage pipe, could pass beyond the shutter 3 when the latter is in the first configuration.

Preferably, the above-mentioned gaseous fluids are composed of the gaseous component given off by the sewage system downstream of the valve device 100, which tends (naturally) to flow towards the appliances connected to the drainage pipe.

Preferably, the shutter 3, when in the first configuration, occludes a cross-section 210 of the main duct 201 that is upstream of the access opening 209 of the pipe 200. In particular, through the above-mentioned cross-section 210 the wastewater coming from the opening 204 of the pipe 200 flows towards the outlet opening 205.

Preferably, the shutter 3 comprises a first and second opposing surface 5, 6 and has a reduced thickness compared to the extension of the above-mentioned surfaces 5, 6. In particular, the surfaces 5, 6 constitute the most developed part of the shutter 3. Preferably, the shutter 3 has a gradually reduced thickness from the fixing element 1 towards its free end longitudinally opposite the fixing element 1. For example this thickness is reduced from 8 mm to 0.5 mm.

The first and second surface 5, 6 of the shutter 3 are facing towards the inlet opening 204 and outlet opening 205 respectively of the pipe 200 when the valve device 100 is inserted therein.

Preferably, the extension of the surfaces 5, 6 of the shutter 3 is at least equal to the cross-section 210 of the main duct 201. In this way, the shutter 3, when inserted into the passage 203 and not subjected to the flow of the wastewater, is placed in contact with the internal surface 202 of the main duct 201, thus occluding it.

In the second configuration, the shutter 3 leaves the passage 203 of the main duct 201 sufficiently free for the wastewater to flow from the inlet opening 204 to the outlet opening 205 of the pipe 200.

According to an aspect of the invention, the valve device 100 comprises a main body 4 made of a elastically deformable material that at least partly defines the shutter 3. The main body 4 at least partially occludes the passage 203 of the main duct 201 when the shutter 3 is in the first configuration so that a pressure exerted by the wastewater on the shutter 3, when it flows from the inlet opening 204 of the pipe 200 towards the outlet opening 205, causes a reversible elastic deformation of the main body 4 that forces the shutter 3 to move from the first configuration to the second configuration.

In particular, the pressure exerted by the wastewater on the shutter 3 causes the detachment of at least one portion thereof from the internal surface 202 of the main duct 201 and the said portion to move closer towards the fixing element 1. The gap thus defined between the shutter 3 and the internal surface 202 of the main duct 201 allows the passage of the wastewater from the inlet opening 204 of the pipe 200 towards the outlet opening 205.

Preferably, a pressure greater than or equal to 20 mm water column (i.e. greater or equal to about 200 Pa) exerted by the wastewater on the shutter 3 causes a reversible elastic deformation of the main body 4, which forces the shutter 3 to move from the first configuration to the second configuration.

Preferably, a pressure exerted by the wastewater on the shutter 3, whose value expressed in metre water column is less than or equal to the product obtained by multiplying the diameter (in metres) of the main duct 201 by 0.8, causes a reversible elastic deformation of the main body 4 which forces the shutter 3 to move from the first configuration to the second configuration.

In other words and considering that 1 metre water column is equal to 9806.65 Pa, a pressure exerted by the wastewater on the shutter 3 whose value expressed in Pascal is less than or equal to the product obtained by multiplying the diameter (in metres) of the main duct 201 by 7845, causes a reversible elastic deformation of the main body 4 which forces the shutter 3 to move from the first configuration to the second configuration.

More preferably, the pressure exerted by the wastewater on the shutter 3 that causes a reversible elastic deformation of the main body 4, which forces the shutter 3 to move from the first configuration to the second configuration, is between 200 Pa and 900 Pa, more preferably between 200 and 600 Pa.

The valve device 100 according to the invention is thus capable of blocking the rise of fumes from the sewage system inside dwellings or, more generally, towards the buildings connected to this sewage system. Furthermore, these characteristics allow the shutter 3 to block the rise into the drainage pipe of any insect infestations.

It will also be noted that the fact that the fixing element 1 is arranged to be connected to the inspection neck 206 and, in particular, to interfere with the internal wall 208 of the inspection neck 206, allows a simple positioning of the valve device 100 in the pipe 200.

In fact, the installation of the valve device 100 in the pipe 200 will require merely the introduction of the shutter 3 in the passage 203 of the pipe 201 through the inspection neck 206. In particular, the interference between the perimetric surface 2 of the fixing element 1 and the internal wall 208 of the inspection neck 206 enables the valve device 100 to be positioned in a stable manner in the pipe 200. Furthermore, the valve device 100 can be removed from the pipe 200 through the inspection neck 206.

Another advantage of the valve device 100 according to the invention lies in the fact that it can be installed in common pipes provided with an inspection neck of the duck for the flow of wastewater, not requiring the use of pipe fitting created ad hoc and therefore provided with specific seats for the installation of a respective valve such as, for example, non-return valves. It must also be noted that the valve device 100 according to the invention does not constitute a non-return valve understood as a valve that allows a fluid to flow in one direction only, such as the above-mentioned known valves.

In fact, the paddle of the non-return valves must be sufficiently rigid to withstand and block any return flows directed upstream of the drainage pipe, while the provision of the main body 4 in the valve device 100 allows the latter to hold back any gaseous component given off by the sewage system without, however, preventing the flow of liquid fluids inside the pipe 200 in which it is inserted.

This allows to be obtained a valve device 100 that requires a decidedly lower manufacturing cost than known non-return valves whilst resolving the long-standing problem of the rise of fumes from the sewage system and their spread into the rooms.

Preferably, the main body 4 is made of a material with a modulus of elasticity of between 1 and 5 MPa, more preferably between 1.5 and 3 MPa in accordance with Standard ASTM D412 DIE C, where ASTM is the acronym for American Society for Testing and Materials International.

More preferably, the material of which the main body 4 is made has a modulus of elasticity of 2.6 MPa in accordance with Standard ASTM D412 DIE C.

Preferably, the material of which the main body 4 is made has a tensile strength of between 5 and 12 MPa in accordance with Standard ASTM D412 DIE C, more preferably within the range [7.5-10.5] MPa in accordance with Standard ASTM D412 DIE C.

Preferably, the main body 4 is made of a silicone material.

The main advantages of silicone material are optimum chemical inertia and thermal stability, as well as good electrical insulation properties.

Preferably, the main body 4 has a thickness of between 0.5 and 8 mm, more preferably between 0.5 and 2 mm. Preferably, the main body 4 has a progressively reduced thickness in a direction that runs from the fixing element 1 towards the free end of the shutter 3 longitudinally opposite the fixing element 1. By way of example, this thickness is reduced from around 8 or 6 mm to around 0.5 mm.

FIGS. 1-5 show a preferred embodiment of the valve device 100.

According to the preferred embodiment of the invention, the fixing element 1 is shaped so that the perimetric surface 2 interferes by friction with the internal wall 208 of the inspection neck 206 in order to hold the valve device in the pipe 200 in a desired position.

In this way, the valve device 100 can be inserted and push-fitted into the pipe 200. Furthermore, the removal of the valve device 100 from the pipe 200 is particularly easy.

Preferably, the valve device 100 is held in the main duct 201 by a coupling between the fixing element 1 and the internal wall 208 of the inspection neck 206 which is ensured by the shape thereof.

With reference to FIGS. 1-5, the fixing element 1 has a discoid or cylindrical shape, the lateral wall of which is defined by the perimetric surface 2. The diameter of the perimetric surface 2 is substantially the same as that of a circular section of the internal wall 208 of the inspection neck 206.

Preferably, the fixing element 1 comprises a substantially flat bottom base 7 which is intended to rest on a shoulder of the main duct 201 at the access opening 209 to the passage 203. The shoulder of the main duct 201, defined between the portion where the main duct 201 and the inspection neck 206 meet, offers a resting surface on which the fixing element 1 can be positioned.

Preferably, the fixing element 1 is provided with one or more protrusions 8 extending radially from the perimetric surface 2. Preferably, the protrusions 8 are made of a resilient material so that the introduction of the fixing element 1 into the inspection neck 206 of the pipe 200 causes their compression for a better stabilisation of the valve device 100 inside the pipe 200.

Preferably, the fixing element 1 comprises at least one perimetric fin 10 extending axially and as an extension of the perimetric surface 2 in order to increase the interference between the fixing element 1 and the internal wall 208 of the inspection neck 206.

With reference to FIG. 4, the fixing element comprises a pair of opposing perimetric fins 10. This feature advantageously allows the valve device 100 to be positioned in the pipe 200 so that the fixing element 1 can be inclined in relation to the longitudinal development of the hole 207 of the inspection neck 206, thus adapting the positioning of the valve device 100 to different geometries of the pipe 200 or specific situations of the drainage pipe.

According to an aspect of the invention, the main body 4 comprises the shutter 3 and an annular portion 12 formed integrally with the shutter 3, the annular portion 12 including the perimetric surface 2. In other words, the shutter 3 and the annular portion 12 form one piece, preferably obtained by moulding elastically deformable material, for example silicone material. This results in a particularly low cost of production of the main body 4.

In particular, said shutter 3 extends from the annular portion 12 to its free end 16 longitudinally opposite the annular portion 12 and, preferably, has a gradually reduced thickness from the annular portion 12 towards its free end 16. By way of example, this thickness is about 8 or 6 mm at the annular portion 12 and gradually reduces to 0.5 mm at the free end 16.

Preferably, the free end 16 of the shutter 3 has an arch profile with the concavity facing the fixing element 1. This characteristic facilitates the movement of the shutter 3 from the first to the second configuration.

Preferably, the shutter 3 extends axially from a bottom edge 11 of the perimetric surface 2 away from the fixing element 1, up to the free end 16 longitudinally opposite the bottom edge 11. In particular, the shutter 3 has a substantially U shape. Preferably, the shutter 3 is concave with the concavity facing the fixing element.

Preferably, when the valve device 100 is held in the pipe 200 by means of the fixing element 1, the shutter 3 has a concavity facing the outlet opening 205 of the pipe 200.

Thanks to these characteristics, the rise pressure of the gaseous component from the sewage system further forces the shutter 3 against the internal surface 202 of the main duct 206 so that this gaseous fluid is held downstream of the valve device 100.

Preferably, in the first configuration of the shutter 3, the free end 16 rests on a bottom portion of the main duct 206 and has a concavity facing the fixing element 1. This facilitates the movement of the shutter from the first to the second configuration.

With reference to FIG. 4, surfaces 5 and 6 of the shutter 3 can comprise a first section extending from the bottom edge 11 and having a gradually greater width in the direction of the free end 16 and a second section with a constant width extending between the first section and the free end 16. The provision of said first section facilitates the deformation of the shutter 3 due to the passage of the wastewater fluid in the main duct 201.

With reference to the invention in which the shutter 3 is included in the main body 4, the first surface 5 of the shutter 3 extends so as to adhere to a section of the internal surface 202 of the main duct 201, preferably at the cross-section 210 thereof, to substantially prevent the flow of gaseous fluids from the outlet opening 205 towards the inlet opening 204 of the pipe 200. Advantageously, the fact that the main body 4 is made of a elastically deformable material allows the shutter 3 to adapt to the shape of the internal surface 202 of the main duct 201 so as to occlude the passage 203.

Preferably, the fixing element 1 comprises a rigid discoid element 13 surrounded by the annular portion 12, the discoid element 13 being provided with gripping means 14 to facilitates gripping of the valve device 100 and its positioning in the pipe 200 used for the passage of wastewater through the hole 207 of the inspection neck 206. With reference to FIG. 5, the discoid element 13 is provided with one or more openings 15, preferably wedge-shaped, that act as gripping means 14.

Moreover, the presence of said openings 15 prevents the presence of a pressure difference between the area below and that above the fixing element 1 that could cause an undesired movement of the valve device 100 when it is positioned in the pipe 200.

An alternative embodiment of the invention is shown in FIGS. 8 and 9. In these figures, the valve device is shown by reference numeral 100'.

In this embodiment, the perimetric surface 2 of the fixing element 1 is provided with adhesive means to secure the fixing element 1 to the internal wall 208 of the inspection neck 206. The shutter 3 of the valve device 100' has the same characteristics as the shutter contained in valve device 100. The invention thus solves the problem posed, whilst at the same time offering many advantages. In particular, the valve device according to the invention solves the problem of the rise of gaseous fluids in a drainage pipe, these fluids coming from a sewage system. Furthermore, the valve device according to the invention is easy to position, in a removable manner, in a drainage pipe and does not require the intervention of specialised persons.

The invention claimed is:

1. A valve device configured to be positioned in a pipe used for the passage of domestic wastewater, said pipe (200) having:
   a main duct (201) having an internal surface (202) which delimits a passage (203) for a flow of wastewater from an inlet opening (204) to an outlet opening (205) of the pipe (200), and
   an inspection neck (206) extending from the main duct (201) in a transverse direction thereto, the inspection neck (206) being provided with a longitudinal hole (207) and an internal wall (208) that radially delimits said hole, the hole (207) defining an access opening (209) to the passage (203) of the main duct (201), said valve device (100) comprising:
   a shutter (3),
   a fixing element (1) configured to be connected to the inspection neck (206) in order to hold the shutter (3) in the passage (203) of the main duct (201) between the inlet opening (204) and the outlet opening (205) of the pipe (200),
   said shutter (3) comprising a first surface (5) and a second surface (6), opposite the first surface (5), the first and second surfaces (5, 6) face towards the inlet opening (204) and outlet opening (205), respectively, of the pipe when the valve device (100) is inserted therein, wherein a length of the first and second surfaces (5, 6) of the shutter (3) is at least equal to a diameter of the pipe (200) and wherein a distance between first and second surfaces (5, 6) gradually decreases from the fixing element (1) up to a free end of the shutter (3) which is longitudinally opposite the fixing element and rests on a bottom portion of the main duct (206) when the valve device (100) is inserted in the pipe (200), the free end of the shutter (3) having a curvature such that at least a portion of the second surface (6) faces upwards towards a bottom surface of the fixing element (1) and extends in a direction generally perpendicular to a diameter of the pipe (200) the shutter being movable between a first configuration in which said shutter (3) is shaped to occlude the passage (203) of the main duct (201) so as to substantially prevent flow of gaseous fluids from the outlet opening (205) towards the inlet opening (204) of the pipe (200), and a second configuration in which said shutter (3) leaves the passage (203) of the main duct (201) sufficiently free for the wastewater to flow from the inlet opening (204) to the outlet opening (205) of the pipe (200), the valve device further comprising a main body (4) made of a elastically deformable material, the main body (4) at least partly defines the shutter (3), said main body (4) at least partially occluding the passage (203) of the main duct (201) when the shutter (3) is in said first configuration so that a pressure exerted by the wastewater on said shutter (3) causes a reversible elastic deformation of said main body (4) that forces said shutter (3) to move from said first configuration to said second configuration, wherein said fixing element (1) is configured to be inserted in the hole (207) of the inspection neck (206), said fixing element (1) comprising a perimetric surface (2) and being arranged so as to be in interference fit with the internal wall (208) of the inspection neck (206) by means of said perimeter surface (2) in order to hold said valve device (100) in the pipe (200) in a desired position.

2. The valve device according to claim 1, wherein said main body (4) is made of a material with a modulus of elasticity of between 1 MPa and 5 MPa.

3. The valve device according to claim 1, wherein said main body (4) has a thickness, which is between 0.5 mm and 8 mm.

4. The valve device according to claim 1, wherein the main body is subject to a reversible elastic deformation when a predetermined pressure difference occurs across said shutter (3) which forces the shutter to move from the first configuration to the second configuration.

5. The valve device according to claim 1, wherein said perimetric surface (2) is provided with adhesive means to secure the fixing element (1) to said internal wall (208) of the inspection neck (206).

6. The valve device according to claim 1, wherein said fixing element (1) comprises a substantially flat bottom base (7) which is configured to rest on a shoulder of the main duct (201) at the access opening (209) to the passage (203) of the main duct (201).

7. The valve device according to claim 1, wherein said fixing element (1) is provided with at least one protrusion (8) extending radially from said perimetric surface (2).

8. The valve device according to claim 1, wherein said fixing element (1) comprises at least one perimetric fin (10) extending axially and as an extension of said perimetric surface (2).

9. The valve device according to claim 1, wherein said shutter (3) extends from a bottom edge (11) of said perimetric surface (2) away from said fixing element (1).

10. The valve device according to claim 1, wherein said main body (4) is made of a silicone material.

11. The valve device according to claim 1, wherein said shutter (3) is provided with a free end (16) longitudinally opposite said fixing element (1), said free end (16) having an arch profile with a concavity thereof facing said fixing element (1).

12. The valve device according to claim 1, wherein said main body (4) comprises said shutter (3) and an annular portion (12) formed integrally with said shutter (3), said annular portion (12) including said perimetric surface (2).

13. The valve device according to claim 12, wherein said fixing element (1) comprises a rigid discoid element (13) surrounded by said annular portion (12), said discoid element (13) being provided at least one wedge-shaped opening (15) to facilitate gripping of said valve device (100) and its positioning in the pipe (200) used for the passage of wastewater through the hole (207) of the inspection neck (206).

\* \* \* \* \*